(12) United States Patent
Sugimoto et al.

(10) Patent No.: US 7,609,017 B2
(45) Date of Patent: Oct. 27, 2009

(54) OPEN/CLOSE BODY DRIVE DEVICE

(75) Inventors: Kazutaka Sugimoto, Sakura (JP);
Yoshikazu Ito, Sakura (JP); Tomokazu Murakami, Ueda (JP)

(73) Assignees: Shinano Kenshi Kabushiki Kaisha, Ueda-Shi, Nagano (JP); Yachiyo Kogyo Kabushiki Kaisha, Sayama-Shi, Saitama (JP)

( * ) Notice: Subject to any disclaimer, the term of this patent is extended or adjusted under 35 U.S.C. 154(b) by 140 days.

(21) Appl. No.: 11/920,770

(22) PCT Filed: May 23, 2006

(86) PCT No.: PCT/JP2006/310213

§ 371 (c)(1),
(2), (4) Date: Nov. 20, 2007

(87) PCT Pub. No.: WO2006/134753

PCT Pub. Date: Dec. 21, 2006

(65) Prior Publication Data

US 2009/0121664 A1 May 14, 2009

(30) Foreign Application Priority Data

Jun. 13, 2005 (JP) ............................. 2005-172054

(51) Int. Cl.
*G05B 5/00* (2006.01)
(52) U.S. Cl. ........................ 318/445; 318/280; 318/466; 318/459; 49/26; 49/28
(58) Field of Classification Search ................... 318/443, 318/445, 280, 283, 286, 466, 461, 468, 500, 318/459; 49/26, 28
See application file for complete search history.

(56) References Cited

U.S. PATENT DOCUMENTS

| 5,507,119 | A | * | 4/1996 | Sumiya et al. | 49/218 |
| 6,082,433 | A | * | 7/2000 | Vafaie et al. | 160/310 |
| 6,390,520 | B1 | * | 5/2002 | Holzer | 292/341.17 |
| 2004/0251868 | A1 | * | 12/2004 | Sato et al. | 318/652 |

FOREIGN PATENT DOCUMENTS

| JP | 5-236791 A | 9/1993 |
| JP | 2001-112282 A | 4/2001 |
| JP | 2002-349137 A | 12/2002 |

* cited by examiner

*Primary Examiner*—Rina I Duda
(74) *Attorney, Agent, or Firm*—Birch, Stewart, Kolasch & Birch, LLP

(57) ABSTRACT

The open/close body drive device is capable of restarting a brushless motor, without using magnetic pole sensors, so as to securely drive an open/close body in an arbitrary direction when any of the magnetic pole sensors has failed. When a CPU (1) detects an abnormal logic as a detection pattern of the magnetic pole sensors (9), the CPU (1) determines that the sensor has failed and temporarily stops drive of a DC brushless motor (5), and a motor drive unit (4) generates a phase switching signal to prolong one of electric connection patterns for performing sensorless drive when restarting the DC brushless motor (5).

4 Claims, 5 Drawing Sheets

FIG.3A
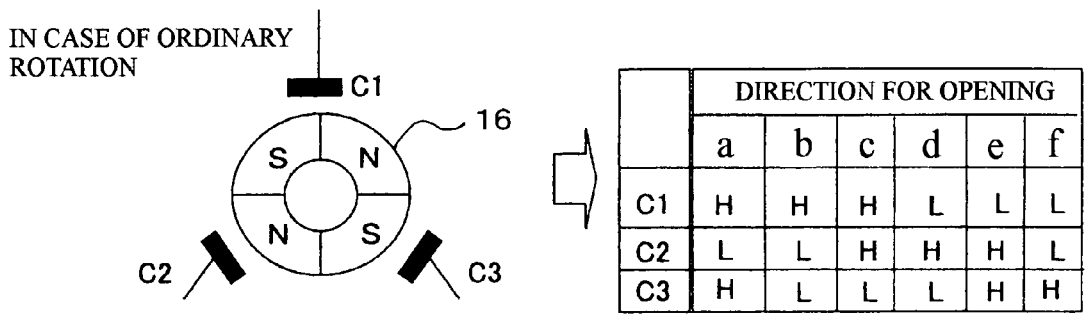
FIG.3B
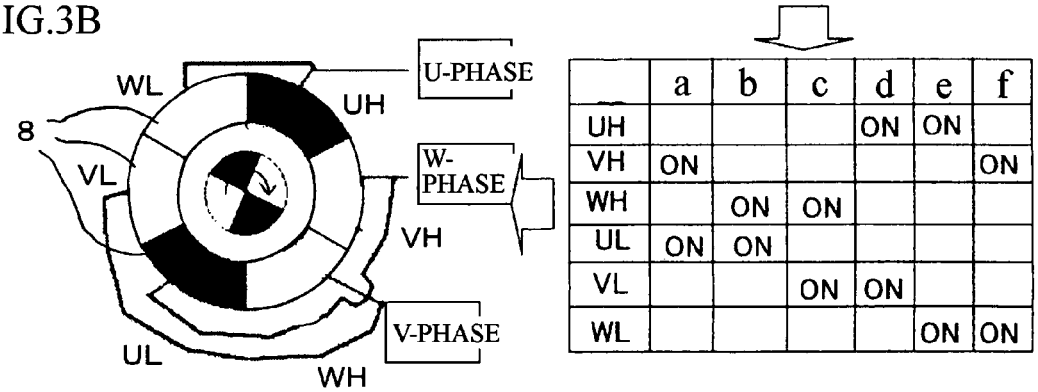
FIG.4
IN CASE OF FAILED HALL IC
| Ex. C3 IS SHORTED | | | | | |
|---|---|---|---|---|---|
| | a | b | c | d | e | f |
| C1 | H | H | H | L | L | L |
| C2 | L | L | H | H | H | L |
| C3 | L | L | L | L | L | L |

ELECTRIC CONNECTION PATTERNS FOR OPENING

|    | a  | b  | c  | d  | e  | f  | g  |
|----|----|----|----|----|----|----|----|
| UH |    |    |    |    | ON | ON |    |
| VH | ON | ON |    |    |    |    | ON |
| WH |    |    | ON | ON |    |    |    |
| UL | ON | ON | ON |    |    |    |    |
| VL |    |    |    | ON | ON |    |    |
| WL |    |    |    |    |    | ON | ON |

OPEN/CLOSE BODY DRIVE DEVICE

FIELD OF TECHNOLOGY

The present invention relates to an open/close body drive device, for example, a sunroof, a power window, etc. of a motor vehicle.

BACKGROUND TECHNOLOGY

A sunroof unit will be explained as an example of an open/close body drive device of a motor vehicle. In the sunroof unit, a slide panel is attached to an opening of a fixed roof and can be moved backward and forward, a rear end of the slide panel can be tilted upward and downward, and the slide panel is connected to and driven by a push-pull cable. The push-pull cable is pushed and pulled by rotating a motor, which has a reduction unit, in a normal direction and a reverse direction, so that the slide panel can be opened and closed. A DC brush motor is usually used as a drive source. The brush motor is rotated by applying electric power via a brush, a rectifying member (commutator) and a relay, and rotation number of the motor is detected by hall ICs so as to control a position of the open/close body.

In case of an open/close body of a motor vehicle, there is a possibility of stopping the open/close body halfway when a motor is stopped due to, for example, failure. Thus, a so-called fail-safe mechanism is provided so as to move the open/close body to a safe position even if the motor is failed. For example, in the sunroof unit, it is impermissible to leave the roof in the open state, so the roof can be closed by manually rotating transmission gears and compulsorily rotating the motor.

These days, noises around an engine have been lowered, and reducing a total noise of a motor vehicle is further required. A motor noise can be lowered to a tolerable level by reducing rotation number of a brush motor. However, the rotation number must be increased to move the open/close body at a high speed, so that a frictional noise between a brush and a commutator is easily generated. Especially, in case that the motor is driven near a user, the moving speed of the open/close body must be lowered so as to reduce the motor noise.

To solve the problem, using a DC brushless motor as a drive source of the open/close body drive device has been studied. In the DC brushless motor, magnetic pole positions of a rotor magnet are detected and electric connection to stator coils is switched, so a plurality of (e.g., three) magnetic pole sensors (hall ICs) are provided. In case of using the brushless motor, rotation number of the motor (the position of the sunroof) and a rotational direction thereof (the moving direction of the sunroof) can be controlled on the basis of detection signals of the hall ICs.

DISCLOSURE OF THE INVENTION

When the magnetic pole sensor or sensors are failed, the magnetic pole positions of the rotor magnet cannot be detected, the electric connection for generating maximum torque cannot be performed, and the rotation of the motor will be destabilized. If the rotation of the motor is destabilized, the motor must be urgently stopped for the sake of safety. The motor, which has been once stopped, cannot be restarted because the magnetic pole positions of the rotor magnet cannot be detected. Therefore, in the conventional motor vehicle, the open/close body is manually closed, with an interior handle, after the urgent stop, but the interior handle will be removed so as to improve interior decoration of the motor vehicle, so other urgent drive means other than the interior handle is required.

The present invention was conceived to solve the above described problems, and an object of the present invention is to provide an open/close body drive device, which is capable of restarting a brushless motor without using magnetic pole sensors and securely moving an open/close body in an arbitrary direction.

To achieve the object, the present invention has following structures.

The open/close body drive device, which is capable of motor-driving an open/close body attached to a motor vehicle so as to open and close the open/close body, comprises: a DC brushless motor acting as a drive source; a motor drive unit switching drive voltage applied to stator coils on the basis of a rotational position and rotation number of a rotor, which have been detected by a plurality of magnetic pole sensors for detecting positions of magnetic pole positions of a rotor magnet; and a control unit for controlling the motor drive unit so as to open and close the open/close body on the basis of detection signals of the magnetic pole sensors, wherein the control unit determines that the sensor has failed and temporarily stops drive of the DC brushless motor when the control unit detects an abnormal logic as a detection pattern of the magnetic pole sensors, and the motor drive unit generates a phase switching signal to prolong one of electric connection patterns for performing sensorless drive when restarting the DC brushless motor.

In the open/close body drive device, the control unit may generate the phase switching signal to prolong the electric connection patterns of the first two phases of the three-phase stator coils, which are longer than those of ordinary rotation, from an optional stop position, at which the rotor magnet and a stator mutually attract, when restarting the DC brushless motor, so as to perform the sensorless drive with the similar electric connection patterns for each one rotation of the rotor.

In the open/close body drive device, the control unit may perform the sensorless drive of the motor while an open/close switch is pushed.

In the open/close body drive device, the control unit may stop the motor and perform the sensorless drive when the control unit repeatedly detects abnormal logics prescribed times from the first detection.

EFFECTS OF THE INVENTION

In the open/close body drive device of the present invention, the DC brushless motor is used as the drive source; in comparison with the drive device having the brush motor, the drive device of the present invention can reduce harsh noises, which are generated while moving the open/close body, and further has following effects.

The control unit determines that the sensor has failed and temporarily stops the drive of the DC brushless motor when the control unit detects the abnormal logic as the detection pattern of the magnetic pole sensors, and the motor drive unit switches from sensor drive to sensorless drive on the basis of a command. At that time, the motor drive unit generates the phase switching signal to prolong one of electric connection patterns for performing the sensorless drive, so that the open/close body can be securely moved in a prescribed direction without stepping out and stopping the motor.

BRIEF DESCRIPTION OF THE DRAWINGS

FIGS. 3A and 3B are timing charts of sensor detection signals and electric connection patterns of stator coils for sensor drive.

FIG. 4 is an explanation view of sensor detection signals of a failed sensor.

PREFERRED EMBODIMENTS OF THE INVENTION

Preferred embodiments of an open/close body drive device relating to the present invention will now be described in detail with reference to the accompanying drawings. The present invention can be widely applied to many types of open/close body drive devices, in each of which an open/close body (e.g., sunroof, sunshade, power window of a motor vehicle) is opened and closed by a motor.

For example, a sunroof drive device comprises an output gear rotated by a motor, a geared cable (a cable having a spiral gear groove) engaged with the output gear, and a slide panel connected to push-pull means, e.g., plastic belt, and the drive device opens and closes an opening of a fixed roof by sliding the slide panel between a full-open position and a full-close position and tilting a rear end upward at the full-close position. In the sunroof drive device, a three-phase DC brushless motor is suitably used as a drive source.

Figure 1:
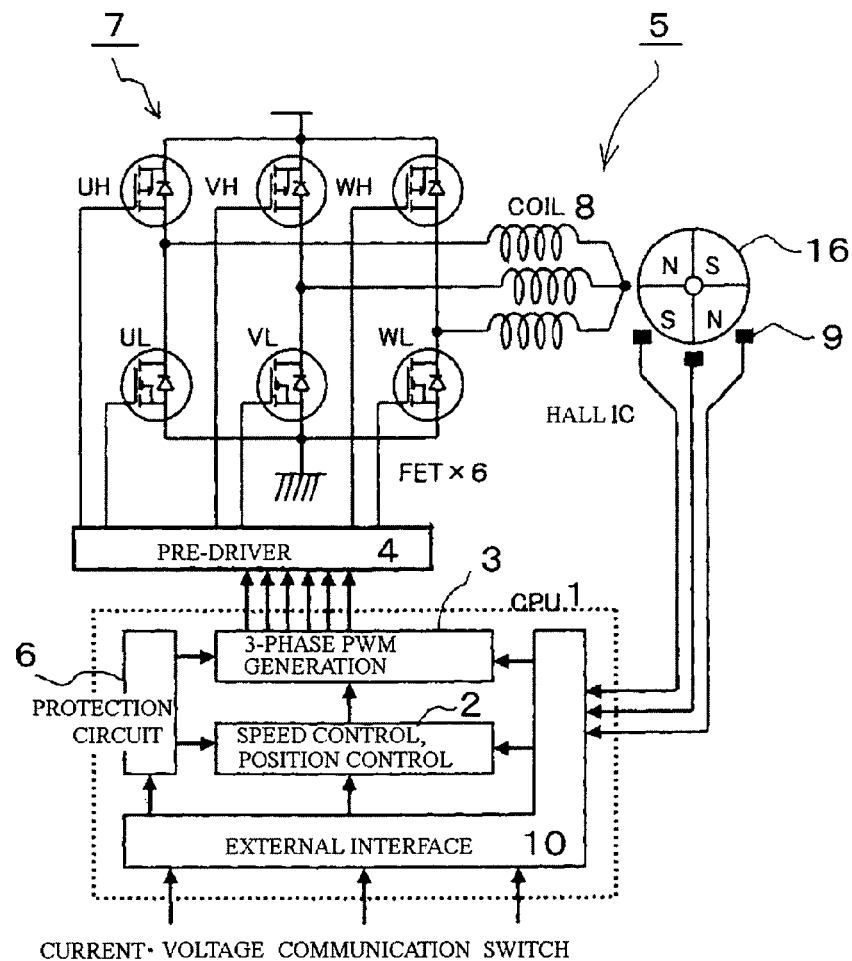
FIG. 1 is a block diagram of an open/close body drive device.

A structure of an open/close body drive device of a motor vehicle will be schematically explained with reference to a block diagram of FIG. 1. Supply voltage (e.g., 12 V) of an electric power source of the motor vehicle, e.g., battery, fuel cell, is stepped down and supplied to a control unit (CPU) 1.

The CPU 1 controls the open/close body drive device, which drives an open/close body, e.g., sunroof, and comprises an open/close body drive control section 2, which controls a speed and a position of the open/close body, and a rotating magnetic field control section (three-phase PWM control section) 3, which generates rotating magnetic fields of a motor. Namely, the CPU 1 including the open/close body drive control section 2 and the rotating magnetic field control section 3 is formed in one chip. A start signal is inputted to the CPU 1 from, for example, a switch of an operation panel, and the open/close body drive control section 2 starts a DC brushless motor 5, which acts as a drive source, via the rotating magnetic field control section 3 and a motor drive unit (pre-user) 4. The voltage stepped down from the battery voltage is supplied to the motor drive unit 4. A protection circuit 6 prevents an over current from passing through the open/close body drive control section 2 and the rotating magnetic field control section 3.

The open/close body drive control section 2 has a nonvolatile memory (e.g., EEPROM). Control data, e.g., positions of the open/close body, the full-open position and the full-close position thereof, a speed reduction position thereof, rotation number of the motor, are stored in the nonvolatile memory, and the control data can be updated if required. For example, a position data of the previous time is read from the nonvolatile memory when the power source is turned on or the drive device is restarted, and a present position of the open/close body is written in the nonvolatile memory when voltage drop of the power source is detected.

The motor drive unit 4 inputs a phase switching signal (drive voltage) to stator coils 8 of the DC brushless motor 5 via a drive circuit (three-phase bridge circuit) 7, which includes FET (Field Effect Transistor), UH, UL, VH, VL, WH, WL or a switching element (e.g., transistor, IGBT), on the basis of a phase switching signal generated by the rotating magnetic field control section 3.

Three-phase detection pulse signals are inputted to the open/close body drive control section 2 and the rotating magnetic field control section 3 from magnetic pole sensors 9, each of which is constituted by an electromagnetic conversion element (e.g., hall element, hall IC, MR sensor) and provided to the DC brushless motor 5.

The open/close body drive control section 2 monitors a moving speed of the open/close body (rotation number of the motor) and pulse number of the phase switching signals on the basis of control programs, and it makes the rotating magnetic field control section 3 regenerate the phase switching signals when the moving speed (rotation number of the motor) is slower or faster. Further, the open/close body drive control section 2 generates position data of the open/close body by using three-phase detection pulse signals.

The voltage stepped down from the battery voltage and an electric current are supplied to the CPU 1, and input signals, which are inputted by an operation switch or serial communication (communication with other in-vehicle units via ECU), are inputted thereto via an external interface 10. The CPU 1 makes the rotating magnetic field control section 3 generate rotating magnetic fields so as to start the DC brushless motor 5, which acts as the drive source, via the motor drive unit (pre-user) 4 on the basis of the inputted signals and data sent from the open/close body drive control section 2, e.g., the moving speed and the position of the open/close body. In case of the sunroof drive device, a roof drive cable, which is connected to the slide panel via a reduction unit, and the plastic belt (push-pull means) are pushed and pulled by starting the DC brushless motor 5.

Figure 2:
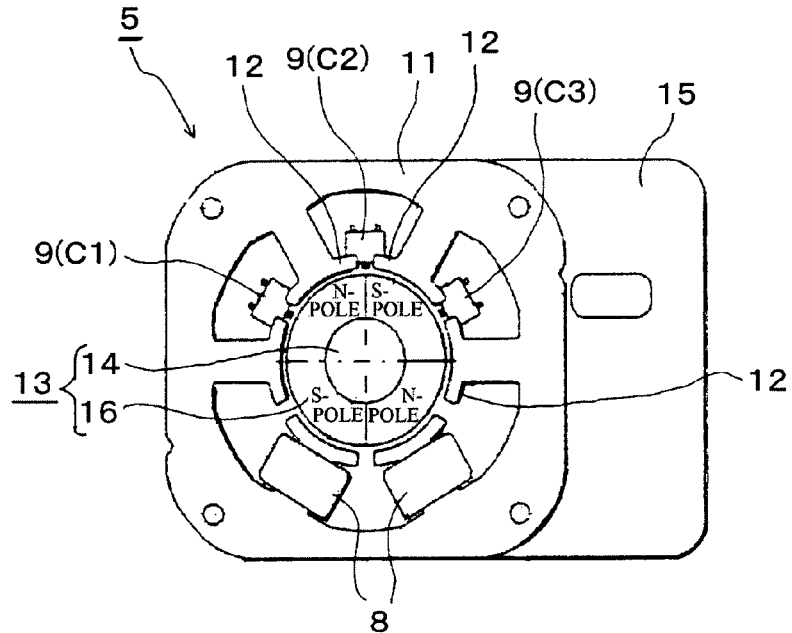
FIG. 2 is an explanation view of a three-phase DC brushless motor.

Successively, the structure of the DC brushless motor 5 will be explained with reference to FIG. 2.

For example, a four-pole/six-slot inner rotor type three-phase DC brushless motor may be suitably used as the DC brushless motor 5. A stator core 11 is, for example, a laminated core, and six stator teeth 12 are radially inwardly extended. A stator coil 8 is wound on each of the stator teeth 12. A rotor 13 is provided in a space enclosed by the stator core 11. By employing the inner rotor type motor whose rotor has a small diameter, inertia can be made small, noises can be reduced due to less rotational vibration, and a process for rotation-balancing the rotor 13 can be omitted. Three magnetic pole sensors 9, each of which is constituted by the electromagnetic conversion element (e.g., hall element, hall IC, MR sensor) and faces the rotor 13, are provided in the vicinity of an outer edge of the rotor. The magnetic pole sensors 9 are provided on a sensor board 15, which is arranged perpendicular to a motor shaft 14. The sensor board 15 is electrically connected to a control circuit on a control board, not shown. Note that, the DC brushless motor 5 is not limited to the four-pole/six-slot motor, for example an eight-pole/12-slot motor may be employed.

Next, ordinary sensor drive of the open/close body drive device and sensorless drive, which is performed when a hall IC is failed, will be explained.

FIG. 3 shows timing charts of output patterns a-f of the magnetic pole sensors 9 when a rotor magnet 16 having four magnetic poles is rotated a mechanical angle of 180 degrees by the ordinary sensor drive. The rotor magnet 16 is rotated in the direction for opening the open/close body, and the magnetic pole sensors 9 (hall ICs: C1, C2 and C3), which are arranged with phase shift of 120 degrees, generate detection signals (hall signals). In the present embodiment, the motor is the four-pole motor, so each of the magnetic pole sensors 9 generates two pulses per rotation, and pulses of the three phases are generated with phase shift of an electric angle of 120 degrees (in the motor, an electric angle of 360 degrees=a mechanical angle of 180 degrees).

Next, a phase switching action of the three-phase DC brushless motor 5 will be explained with reference to FIGS. 3A and 3B, which are schematic views and timing charts of the sensors or electric connection patterns. Output signals for three phases, which are mutually shifted the electric angle of 120 degrees (in the motor, an electric angle of 360 degrees=a mechanical angle of 180 degrees), are inputted to the stator coils 8, i.e., two of a U-phase, a V-phase and a W-phase. For example, when the output signals of the magnetic pole sensors 9 are C1=H (High), C2=L (Low) and C3=H (High) (see FIG. 3A), the electric power is supplied to a VH-phase and a UL-phase of the stator coils 8 (see FIG. 3B). On the other hand, when the output signals of the magnetic pole sensors 9 are C1=H (High), C2 and C3=L (Low) (see FIG. 3A), the electric power is supplied to a WH-phase and the UL-phase of the stator coils 8 (see FIG. 3B).

Next, the sensorless drive, which is performed when the magnetic pole sensor 9 (e.g., the hall IC C3) is failed, will be explained.

In output patterns a-f shown in FIG. 4, if the hall IC C3 is failed, the sensor output signal is L (Low) (or H (High)) without reference to the rotational position of the rotor magnet 16. Therefore, the output signals of the all sensors C1, C2 and C3 are L (Low) (or H (High)), so an abnormal logic is detected (see FIG. 4*f*).

Figure 9:
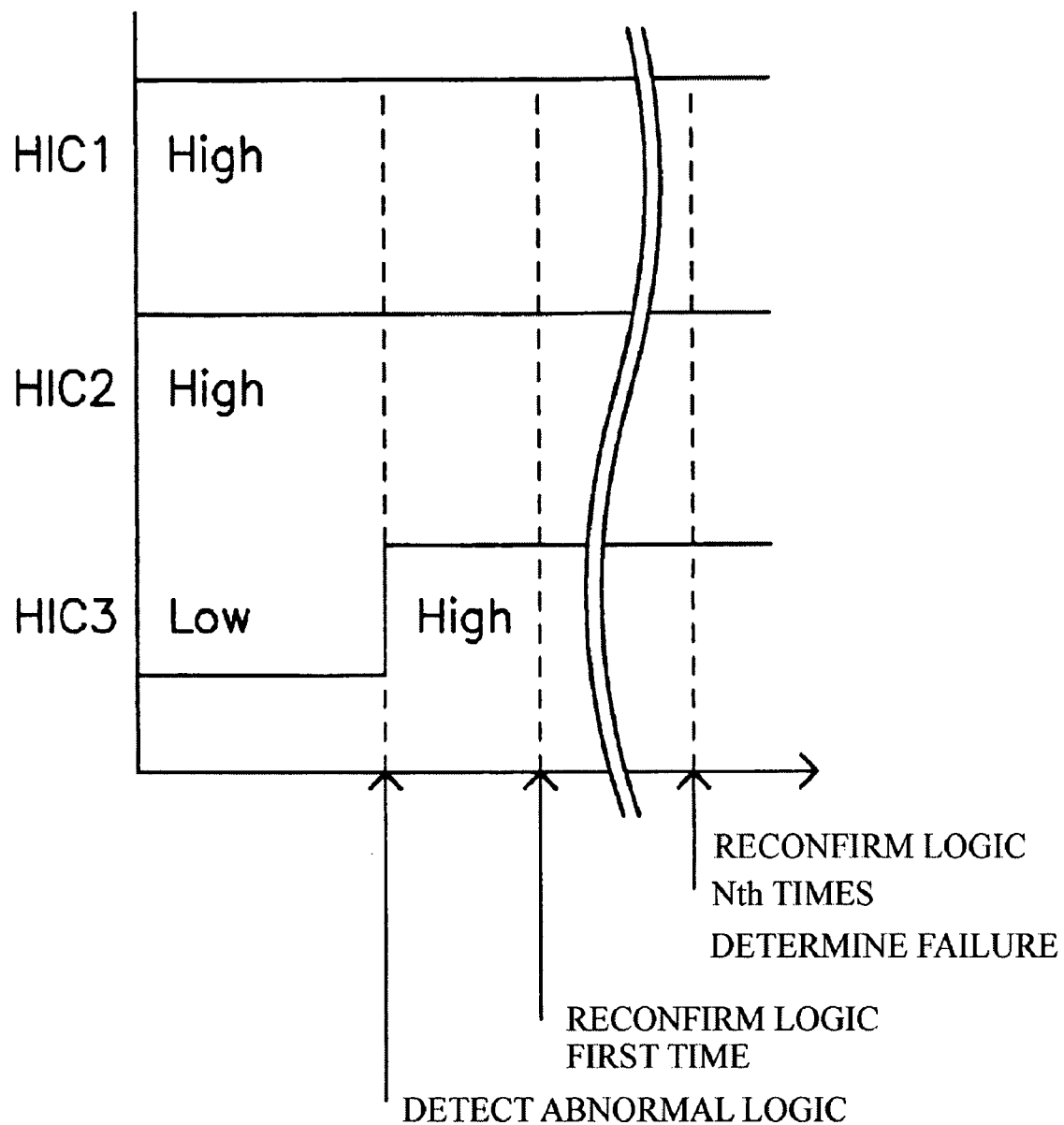
FIG. 9 is a timing chart for detecting an abnormal logic.

In FIG. 9, the CPU 1 detects an abnormal logic (e.g., all of the hall ICs C1, C2 and C3 are High) prescribed times; for example, in case that the logic is repeatedly checked N times (N≧1, N is a natural number), and the abnormal logic is detected the Nth time, the motor is stopped and the sensorless drive is performed. With this method, detection errors caused by mechanical vibration and noises can be omitted, so that driving reliability can be improved.

When the abnormal logic is detected, the CPU 1 determines that the magnetic sensor 9 is failed and temporarily stops the DC brushless motor 5, and then the drive of the open/close body is switched from the sensor drive to the sensorless drive when a command is inputted by tuning on the open/close switch. When the DC brushless motor 5 is restarted by the sensorless drive, the motor drive unit 4 generates a phase switching signal to prolong one of electric connection patterns. With this action, the open/close body can be securely moved in an arbitrary direction without stepping out and stopping the motor 5.

Position data of the open/close body, which are generated by the CPU 1, are 12 patterns per rotation, and they are gained by counting a rising edge and a trailing edge of each of three-phase detection pulses outputted from the magnetic sensors 9.

Figure 5:
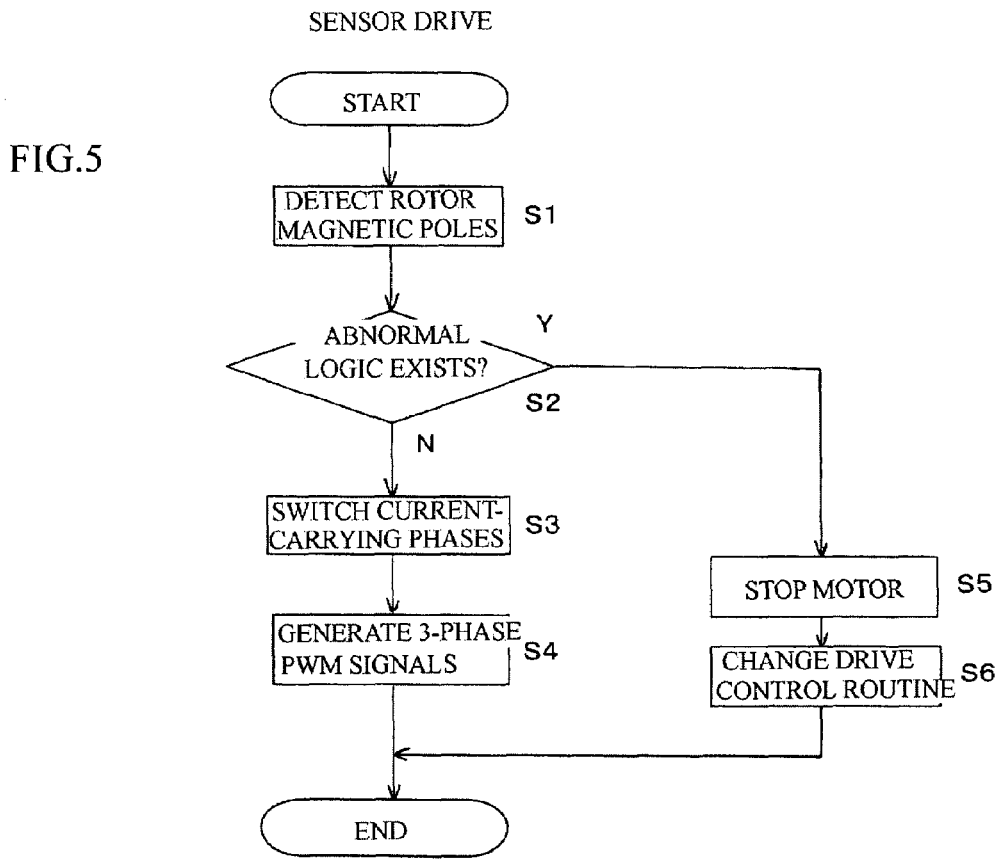
FIG. 5 is a flowchart of a motor control action for performing sensor drive.

A flowchart of controlling the motor for the sensor drive is shown in FIG. 5.

The CPU 1 detects magnetic pole signals, which are sent from the hall ICs with rotation of the motor (step S1), and checks if there is an abnormal logic in magnetic pole logics or not (step S2). If no abnormal logic is detected, current-carrying phases are switched (step S3), and three-phase PWM signals, which have been generated by the rotating magnetic field control section 3 (see FIG. 1), are inputted to the motor via the pre-user 4 (step S4). If an abnormal logic is detected in the magnetic pole logics in the step S2, the motor 5 is stopped (step S5), and a drive control routine of the open/close body drive control section 2 (see FIG. 1) is switched for the sensorless drive (step S6).

Figure 6:
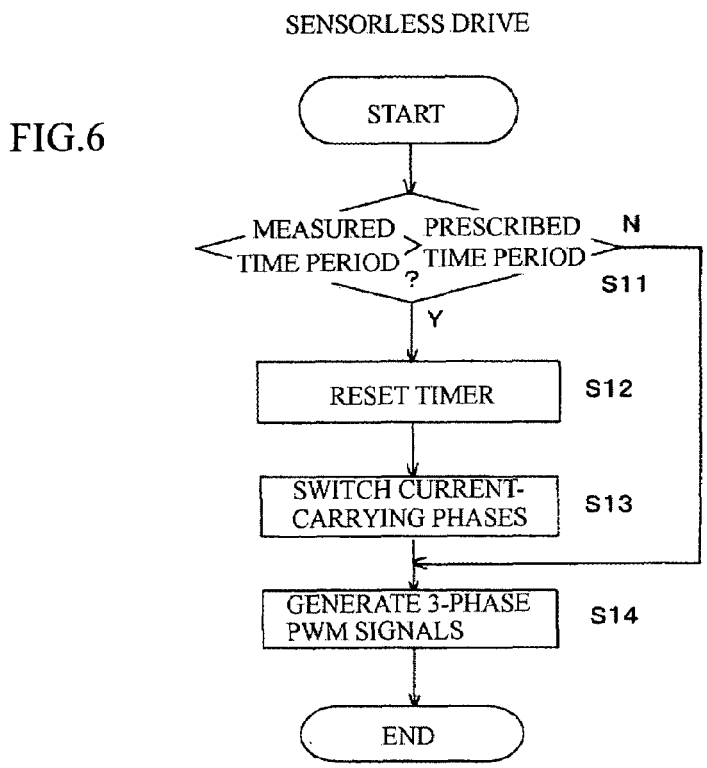
FIG. 6 is a flowchart of a motor control action for performing sensorless drive.

A flowchart of controlling the motor for the sensorless drive is shown in FIG. 6.

The CPU 1 measures a time period of electric connection for each phase by a built-in timer, and phase change is performed when a prescribed time period passes. When the measured time period exceeds the prescribed time period (step S11), the CPU 1 resets the timer (step S12), and then the current-carrying phases are changed to switch the electric connection pattern (step S13). Namely, three-phase PWM signals, which have been generated by the rotating magnetic field control section 3 (see FIG. 1) for the sensorless drive, are inputted to the motor via the pre-user 4 (step S14).

Figures 7, 8:
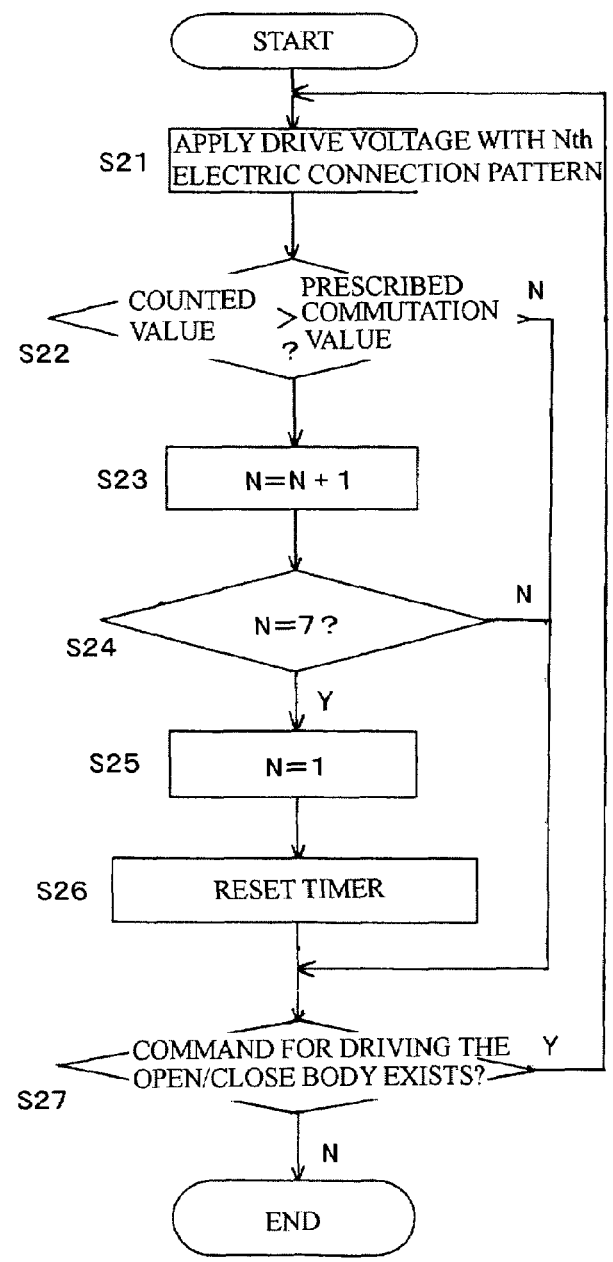
FIG. 7 is an explanation view of electric connection patterns of the stator coils for performing the sensorless drive.
FIG. 8 is a flowchart of an electric connection control action for performing the sensorless drive.

The electric connection patterns a-g for the sensorless drive are shown in FIG. 7.

The CPU 1 generates the phase switching signal so as to prolong one of the electric connection patterns of the three-phase stator coils 8. When the brushless motor is restarted, the CPU 1 generates the phase switching signal so as to prolong the electric connection patterns of the first two phases of the three-phase stator coils 8, which are longer than those of ordinary rotation, from an optional stop position, at which the rotor magnet 16 and the stator core 11 (the stator teeth 12) mutually attract. Then, the sensorless drive is performed with the same electric connection patterns for each one rotation of the rotor 13.

Namely, the electric connection pattern is changed from 12 patterns per rotation for the sensor drive to 14 patterns per rotation as shown in FIG. 7; the electric power is supplied to, for example, the VH-phase and the UL-phase of the stator coils 8 for the time period of two patterns (e.g., the electric connection patterns a and b), which is counted by the timer. With this action, the positions of the magnetic poles of the rotor magnet 16, which faces the stator teeth 12, are stabilized, so that the motor 5 can be stably driven without step-out. From the electric power is supplied to the WH-phase and the UL-phase as the third pattern (the electric connection pattern c), the phase change is performed every time the timer counts one pattern. When the seventh pattern (the electric connection pattern g) is completed, the electric connection patterns are repeated from the first pattern (the electric connection pattern a) to the seventh pattern (the electric connection pattern g), so that the open/close body, which has been temporarily stopped, can be moved in the prescribed direction and the opening of the fixed roof can be opened (or closed). The sensorless drive is performed with the same electric connection patterns for each one rotation of the rotor 13; even if the rotor 13 cannot rotate with following the phase switching signals, which change the phases of the stator coils 8, in the first rotation, the rotor starts to rotate when the rotor magnet 16 and the stator teeth 12 are magnetically balanced in the second rotation or later, so that the open/close body can be securely opened and closed. The CPU 1 performs the sensorless drive of the motor while the open/close switch is pushed. The open/close body is frequently moved in the direction for closing, but sometimes moved in the direction for opening so as to, for example, evacuate from a vehicle rolled over. Therefore, the switch is used to open or close the open/close body.

FIG. 8 is a flowchart of the motor control action for the sensorless drive. When a user inputs a command for starting the sensorless drive, three-phase PWM signals, which have been generated by the rotating magnetic field control section 3 of the CPU 1 (see FIG. 1) are inputted to the motor via the pre-user 4. Drive voltage is applied to the stator coils 8 with the Nth (1st to 7th) electric connection pattern (step S21). When the voltage is applied to the stator coils 8, the timer starts to count, and the counted value is checked if the value exceeds a prescribed commutation value or not (step S22). If the counted value is less than the prescribed commutation value, the control action goes to a step S27 so as to confirm if the user inputs the starting command or not.

If the counted value is greater than the prescribed commutation value, the electric connection pattern is changed from the Nth (1st to 7th) pattern to the N+1th pattern (step S23). Next, the control action checks if the present connection pattern is the seventh connection pattern or not (step S24); if the present connection pattern is not the seventh connection pattern, the control action goes to a step S27; and if the starting command of the user is still continued, the electric power is supplied with the Nth pattern until the counted value of the timer reaches the prescribed commutation value.

If the present connection pattern is the seventh connection pattern, the electric connection pattern is returned to the Nth=1st pattern (step S25), and the timer is reset (step S26). If the starting command of the user (inputted by the switch) is cancelled, the rotation of the motor 5 is stopped (step S27). By the above described sensorless drive, the brushless motor, whose magnetic pole sensor has been failed, can be restarted and the open/close body can be moved to a desired position by operating the switch.

In addition to noise reduction by the brushless structure, torque ripple of the motor is restrained and rotational vibration thereof is reduced by passing a sinusoidal current or a pseudo-sinusoidal current through the stator coils 8, so that the motor can be further quieted. Further, in case that the rotor magnet 16 is skew-magnetized or sinusoidal-magnetized in the radial direction, torque ripple and cogging torque can be reduced, so that rotational vibration can be reduced; the motor can be further quieted by combining the method of passing the sinusoidal current or the pseudo-sinusoidal current through the stator coils 8.

What is claimed is:

1. An open/close body drive device, which is capable of motor-driving an open/close body attached to a motor vehicle so as to open and close said open/close body, comprising:

a DC brushless motor acting as a drive source;

a motor drive unit switching drive voltage applied to stator coils on the basis of a rotational position and rotation number of a rotor, which have been detected by a plurality of magnetic pole sensors for detecting positions of magnetic pole positions of a rotor magnet; and a control unit for controlling said motor drive unit so as to open and close said open/close body on the basis of detection signals of the magnetic pole sensors, wherein said control unit determines that the sensor has failed and temporarily stops drive of said DC brushless motor when said control unit detects an abnormal logic as a detection pattern of the magnetic pole sensors, and said motor drive unit generates a phase switching signal to prolong one of electric connection patterns for performing sensorless drive when restarting said DC brushless motor.

2. The open/close body drive device according to claim 1, wherein said control unit generates the phase switching signal to prolong the electric connection patterns of the first two phases of the three-phase stator coils, which are longer than those of ordinary rotation, from an optional stop position, at which the rotor magnet and a stator mutually attract, when restarting said DC brushless motor, so as to perform the sensorless drive with the similar electric connection patterns for each one rotation of the rotor.

3. The open/close body drive device according to claim 1, wherein said control unit performs the sensorless drive of said motor while an open/close switch is pushed.

4. The open/close body drive device according to claim 1, wherein said control unit stops said motor and performs the sensorless drive when said control unit repeatedly detects abnormal logics prescribed times from the first detection.

* * * * *